US012801549B2

(12) United States Patent
Norrie et al.

(10) Patent No.: US 12,801,549 B2
(45) Date of Patent: Nov. 17, 2026

(54) MULTI-PLANE, MULTI-PROTOCOL MEMORY SWITCH FABRIC WITH CONFIGURABLE TRANSPORT

(71) Applicant: Enfabrica Corporation, Mountain View, CA (US)

(72) Inventors: Thomas Norrie, Mountain View, CA (US); Shrijeet Mukherjee, Mountain View, CA (US); John Greth, Mountain View, CA (US); Rochan Sankar, Mountain View, CA (US); Shimon Muller, Mountain View, CA (US); Ariel Hendel, Mountain View, CA (US); Gurjeet Singh, Mountain View, CA (US)

(73) Assignee: Upscale AI, Inc., Santa Clara, CA (US)

( * ) Notice: Subject to any disclaimer, the term of this patent is extended or adjusted under 35 U.S.C. 154(b) by 0 days.

(21) Appl. No.: 18/742,729

(22) Filed: Jun. 13, 2024

(65) Prior Publication Data

US 2024/0330221 A1 Oct. 3, 2024

Related U.S. Application Data

(63) Continuation of application No. 18/639,698, filed on Apr. 18, 2024, which is a continuation of application (Continued)

(51) Int. Cl.
*G06F 13/40* (2006.01)

(52) U.S. Cl.
CPC .. *G06F 13/4022* (2013.01); *G06F 2213/0026* (2013.01)

(58) Field of Classification Search
CPC ......... G06F 13/4022; G06F 2213/0026; G06F 12/0802
See application file for complete search history.

(56) References Cited

U.S. PATENT DOCUMENTS 7,853,591 B1 12/2010 Yang et al.
8,090,789 B1 1/2012 O'Shea et al.

(Continued)

OTHER PUBLICATIONS

Written Opinion and International Search report for International Patent Application No. PCT/US22/032664, dated Oct. 13, 2022 (6 pages).

(Continued)

*Primary Examiner* — Faisal M Zaman
(74) *Attorney, Agent, or Firm* — Fish & Richardson P.C.

(57) ABSTRACT

A multi-plane, multi-protocol memory switch system is disclosed. In some embodiments, a memory switch includes a plurality of switch ports, the memory switch connectable to one or more root complex (RC) devices through one or more respective switch ports of the plurality of switch ports, and the memory switch connectable to a set of endpoints through a set of other switch ports of the plurality of switch ports, wherein the set includes zero or multiple endpoints; a cacheline exchange engine configured to provide a data-exchange path between two endpoints and to map an address space of one endpoint to an address space of another endpoint; and a bulk data transfer engine configured to facilitate data-exchange between two endpoints as a source-destination data stream, one endpoint being designated a source address and another endpoint being designated a destination address.

18 Claims, 6 Drawing Sheets

Related U.S. Application Data

No. 17/835,472, filed on Jun. 8, 2022, now Pat. No. 11,995,017.

(60) Provisional application No. 63/208,618, filed on Jun. 9, 2021.

(56) References Cited

U.S. PATENT DOCUMENTS

| | | | | |
|---|---|---|---|---|
| 9,336,173 | B1 | 5/2016 | Sodke et al. | |
| 9,690,739 | B2 | 6/2017 | Shao et al. | |
| 9,940,123 | B1 | 4/2018 | Ayoub et al. | |
| 10,437,504 | B1 * | 10/2019 | Bao | G06F 3/0685 |
| 11,995,017 | B2 * | 5/2024 | Norrie | G06F 13/4022 |
| 2002/0110130 | A1 | 8/2002 | Benayoun et al. | |
| 2002/0150062 | A1 | 10/2002 | Zheng et al. | |
| 2006/0161709 | A1 | 7/2006 | Davies | |
| 2006/0294261 | A1 | 12/2006 | Nordstrom et al. | |
| 2008/0022054 | A1 | 1/2008 | Hertzberg et al. | |
| 2008/0147943 | A1 | 6/2008 | Freimuth et al. | |
| 2009/0240793 | A1 | 9/2009 | Zhang et al. | |
| 2010/0180062 | A1 | 7/2010 | Hidaka et al. | |
| 2010/0333116 | A1 * | 12/2010 | Prahlad | G06F 3/0605 713/153 |
| 2012/0036306 | A1 | 2/2012 | Miyoshi | |
| 2013/0246650 | A1 * | 9/2013 | Tsuboki | H04L 49/112 709/236 |
| 2015/0161068 | A1 | 6/2015 | Jones | |
| 2015/0229563 | A1 | 8/2015 | Luo | |
| 2015/0261709 | A1 | 9/2015 | Billi | |
| 2015/0339246 | A1 | 11/2015 | Sakurai | |
| 2016/0062894 | A1 * | 3/2016 | Schwetman, Jr. | H04L 67/5681 711/137 |
| 2016/0140074 | A1 | 5/2016 | Lee et al. | |
| 2016/0321012 | A1 * | 11/2016 | Clark | G06F 3/067 |
| 2017/0060800 | A1 | 3/2017 | Watkins et al. | |
| 2017/0132172 | A1 * | 5/2017 | Romem | G06F 16/30 |
| 2017/0185554 | A1 * | 6/2017 | Fricker | G06F 13/4282 |
| 2017/0344419 | A1 | 11/2017 | Watkins et al. | |
| 2018/0067890 | A1 | 3/2018 | Espeseth et al. | |
| 2019/0132198 | A1 | 5/2019 | Li et al. | |
| 2019/0258600 | A1 * | 8/2019 | Das Sharma | G06F 13/20 |
| 2019/0281025 | A1 * | 9/2019 | Harriman | H04L 9/3239 |
| 2020/0036717 | A1 | 1/2020 | Akella et al. | |
| 2020/0065290 | A1 | 2/2020 | Natu | |
| 2020/0104275 | A1 | 4/2020 | Sen et al. | |
| 2020/0145335 | A1 * | 5/2020 | Wijnands | H04L 45/507 |
| 2020/0162357 | A1 | 5/2020 | Zacks et al. | |
| 2020/0278733 | A1 * | 9/2020 | Li | G06F 1/28 |
| 2020/0322287 | A1 | 10/2020 | Connor et al. | |
| 2020/0327088 | A1 * | 10/2020 | Choudhary | G06F 15/163 |
| 2020/0351245 | A1 | 11/2020 | Moore et al. | |
| 2021/0019069 | A1 * | 1/2021 | Sen | G06F 12/122 |
| 2021/0117249 | A1 | 4/2021 | Doshi et al. | |
| 2021/0132999 | A1 * | 5/2021 | Haywood | G06F 9/45558 |
| 2021/0294755 | A1 | 9/2021 | Ayrapetyan et al. | |
| 2021/0311871 | A1 * | 10/2021 | Malladi | G06F 13/4027 |
| 2021/0373951 | A1 | 12/2021 | Malladi et al. | |
| 2024/0264964 | A1 * | 8/2024 | Norrie | G06F 13/4022 |
| 2024/0330221 | A1 * | 10/2024 | Norrie | G06F 13/4022 |

OTHER PUBLICATIONS

U.S. Appl. No. 17/835,742 U.S. Pat. No. 11,995,017, filed Jun. 8, 2022 May 28, 2024, Multi-Plane Multi-Protocol Memory Switch Fabric With Configurable Transport, Thomas Norrie et al.

U.S. Appl. No. 18/639,698, filed Apr. 18, 2024, Multi-Plane Multi-Protocol Memory Switch Fabric With Configurable Transport, Thomas Norrie et al.

* cited by examiner

MULTI-PLANE, MULTI-PROTOCOL MEMORY SWITCH FABRIC WITH CONFIGURABLE TRANSPORT

CROSS REFERENCE TO RELATED APPLICATION

This application is a continuation of and claims priority to U.S. application Ser. No. 18/639,698, filed Apr. 18, 2024, which is a continuation of U.S. patent application Ser. No. 17/835,472, filed Jun. 8, 2022 (now U.S. Pat. No. 11,995, 017, issued May 28, 2024), which claims the benefit of and priority to U.S. Provisional Patent Application No. 63/208, 618, filed on Jun. 9, 2021, the entire contents of each of which are incorporated by reference in their entireties.

TECHNICAL FIELD

This disclosure relates to a memory switch system that supports bulk data transfer and fast cacheline exchange using an internal endpoint mechanism.

BACKGROUND

The amount of data has drastically increased since the advent of artificial intelligence, machine learning, cloud computing, etc. This drastic data growth requires high-speed, high-bandwidth, low-latency solutions (e.g., servers) for seamless data processing. Peripheral component interconnect express (PCIe) is one of the technologies that are widely used in handling a large amount of data. PCIe, however, has some shortcomings such as high communication overheads, reduced performance due to small packet transfer size, lack of load balancing, etc. Computer express link (CXL) builds upon the physical and electrical interfaces of the fifth generation of PCIe (PCIe 5.0) with protocols that establish coherency, simplify the software stack, and maintain compatibility with existing standards. While CXL has evolved to improve host communications with endpoints devices, where root complex devices (e.g., hosts) and endpoint devices are two main types of PCIe devices, CXL does not currently address endpoint-to-endpoint communications.

SUMMARY

To address the aforementioned shortcomings, a multi-plane, multi-protocol memory switch system is provided. In some embodiments, a memory switch includes a plurality of switch ports, the memory switch connectable to one or more root complex (RC) devices through one or more respective switch ports of the plurality of switch ports, and the memory switch connectable to a set of endpoints through a set of other switch ports of the plurality of switch ports, wherein the set includes zero or multiple endpoints; a cacheline exchange engine configured to provide a data-exchange path between two endpoints and to map an address space of one endpoint to an address space of another endpoint; and a bulk data transfer engine configured to facilitate data-exchange between two endpoints as a source-destination data stream, one endpoint being designated a source address and another endpoint being designated a destination address.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
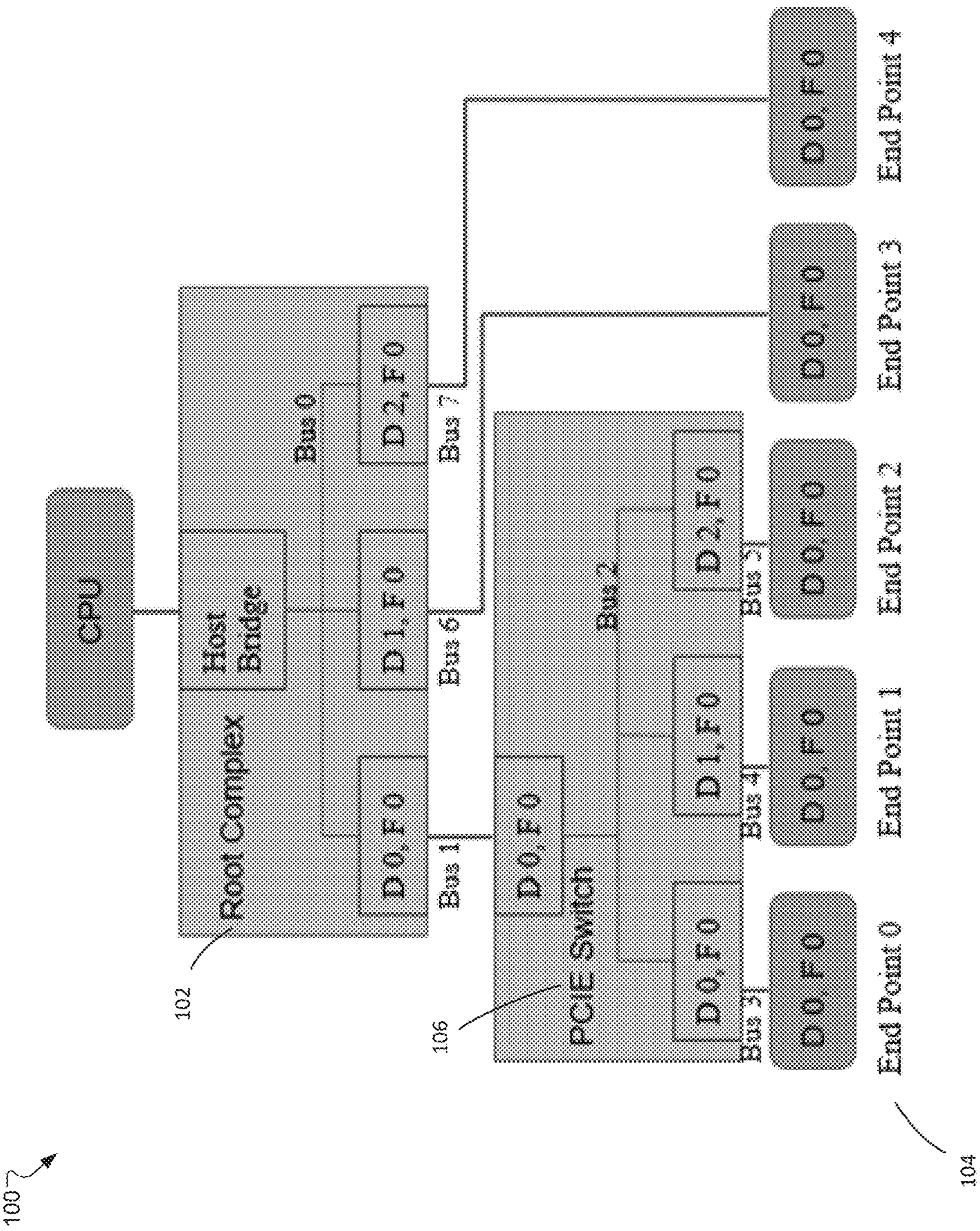
FIG. 1 (Prior Art)
FIG. 1 illustrates an exemplary existing PCIe system, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

PCIe is a high-speed serial computer expansion bus standard. It is the common motherboard interface used to connect a central processing unit (CPU) of a compute server to peripheral hardware in a data center. The peripheral hardware may be graphics cards, hard disk drive host adapters, solid state devices (SSDs), Ethernet network adapters, etc. PCIe has numerous improvements over the prior standards, including higher maximum system bus throughput, lower I/O pin count, smaller physical footprint (e.g., small, better performance scaling for bus devices, and support for advanced error detection and reporting mechanism and native hot-swap functionality.

A significant difference between the PCIe bus and old PCI is the bus topology. PCI uses a shared parallel bus architecture, in which PCI host(s) and devices share a common set of address, data, and control lines. In contrast, PCIe is based on a point-to-point topology, in which separate serial transmit and receive links are used to connect each endpoint device to host(s). A host, typically a root complex (RC)

device, is the root of PCIe topology that connects with CPU and memory. An endpoint device or endpoint is a device that resides at the bottom of the topology and implements a single upstream port toward the RC device. For example, an endpoint can be a SSD or a graphics processing unit (GPU). An endpoint does not have a connection with the CPU or memory. Because of the shared bus topology, access to a PCI bus is arbitrated (e.g., in the case of multiple masters) and limited to one master at a time, in a single direction. On the other hand, a PCIe bus link supports full-duplex communication between any two endpoint devices. For example, PCIe 5.0 provides up to 32 Giga-transfers per second (GT/s) across a single, variable-width PCIe interface.

Due to the limited number of PCIe interfaces supportable on CPUs and endpoint devices, multi-ported PCIe switches are typically incorporated into data center server designs to increase PCIe fanout between devices. A PCIe switch connects to one or more RC devices (e.g., typically a CPU host) through one or more PCIe ports, and connects to subordinate endpoint devices through the remaining PCIe ports. A PCIe switch may expand the limited number of PCIe interfaces so that more PCIe interfaces are available for a host to support more endpoint devices. PCIe interfaces provide link-level reliability between endpoint devices; however, there is no end-to-end reliability protocol in a switched PCIe network.

PCIe and Ethernet have commonalities and distinctions. Ethernet encompasses a collection of wired networking technologies that provide high-performance serial communication. Based on recent standards, Ethernet can transmit data up to 800 Gigabits per second per link between devices and systems across local area networks (LANs) in a data center. Streams of data communicated over Ethernet are usually divided into frames or packets, which carry multiple layers of communication protocols and data according to the open systems interconnection (OSI) network model. Like PCIe, Ethernet supports full-duplex communication between sources and destinations over point-to-point links. The sources and destinations on Ethernet can be interconnected via intermediate switches or routers. Ethernet packets switched over the network can vary in size from 64 bytes (64B) to a value of a large maximum transmission unit or MTU (e.g., up to 16 kilobytes/KB in some cases). Ethernet switches generally do not provide reliability guarantees. For example, Ethernet switches may drop packets when network congestion or corruption happens. Ethernet may also deliver flow control messages to sources and rely on the endpoint source/destination hardware and software stack to implement end-to-end reliability over higher-layer protocols.

FIG. 1 illustrates an exemplary existing PCIe system 100, according to some embodiments. PCIe system 100 is a standard PCIe system built with a hierarchical tree structure. In the hierarchical tree structure shown in FIG. 1, a single RC 102 is connected to multiple endpoints 104 within a common address domain. A PCIe switch 106 acts as a transparent bridge between all PCIe devices including RC 102 and endpoints 104 (e.g., endpoint 0-4). In some embodiments, PCIe switch 106 may also support non-transparent bridging (NTB) such that multiple RC devices may be interconnected through a memory buffer (not shown) in PCIe switch 106. In such a case, each RC and its associated set of endpoints represent a distinct PCIe addressing domain. The NTB memory buffer of PCIe switch 106 can facilitate inter-domain communications between the PCIe devices. As depicted, each PCIe node or device can be identified by a triple BDF, where B denotes a bus number, D denotes a device number, and F denotes a function number. The function number F indicates any functionality in a device that can be reasonably used independent of other functionalities of that device. For example, a GPU card may expose a function for the video component and expose a separate function for the audio component, even if these components exist on the same device. Typically, when multiple instances of a device are used in a PCIe tree, a function number F may identify each instance of the device. For example, an SSD may expose 128 virtual functions. Each of the 128 virtual functions appears as a virtual SSD to each user, and a function number F identifies a virtual SSD.

The communication between PCIe devices is based on transaction layer packets (TLP). PCIe TLP transfers are performed in units, which may have a single maximum size for the whole tree, in the downstream direction or upstream direction. An upstream port is a port that points in the direction of an RC device, and the connection to reach the RC device through the upstream port is upstream. A downstream port is a port that points away from the RC device, and the connection to reach an endpoint through the downstream port is downstream. The data payload size for a TLP cannot exceed the maximum payload size (MPS). For example, the MPS is 4 KB in PCIe 5.0. TLPs are usually much smaller than the MPS due to limited support by PCIe devices. Typically, packet transmission sizes range from 32 to 512 bytes per TLP.

PCIe systems face many challenges. Due to small TLP transfer sizes for traditional CPU load/store accesses, PCIe systems may generate high communication overheads and reduced performance. This problem may be mitigated with the use of a fixed-function offload engine, such as a data streaming accelerator (DSA) on the host RC or a similar engine on an endpoint device. However, using an extra engine may add cost, complexity, and area to each participating PCIe node.

Another problem with PCIe systems is that there is no load balancing or alternative path selection from CPU to BDF (e.g., PCIe nodes) to reduce congestion and performance loss. Also, quality-of-service (QoS) controls are rudimentary and undeployed in most server systems. Although traffic class, virtual channel, and arbitration policies are supported in modern PCIe devices and switches, operational challenges in the multi-vendor ecosystem have limited the adoption of advanced traffic flow management. Conversely, traffic engineering via QOS and differentiated services are well standardized and interoperably deployed across multi-vendor Ethernet systems.

Additionally, once the tree structure has been enumerated and configured, it is difficult to change individual paths in PCIe systems without disturbing the configuration of other devices. Different from Ethernet networks, the identification of upstream, downstream, and entire topology in PCIe systems is fixed and static after the PCIe systems are booted. This prevents dynamic failover and/or provisioning of the PCIe network(s).

As depicted in FIG. 1, PCIe switch 106 may allow peer-to-peer communication, e.g., the communications between endpoints. However, in a tree topology, an upstream port typically supports a much lower bandwidth than the sum of downstream ports. This may create bandwidth chokepoints. Additionally, peer-to-peer communication over PCIe needs special handling and has weak security properties.

PCIe switches, whether operating in a transparent or a non-transparent bridging mode, also suffer from an increased fault domain size. A transparent PCIe bridge isolates PCIe bus segments, offering the ability to extend the number of loads. A non-transparent PCIe bridge is used to support multiprocessor capability. A non-transparent PCIe bridge adds address-domain isolation between the bus segments and acts as an endpoint to discovery software and translates addresses between the two domains. When one PCIe device fails, it usually causes a cascade of failures on all devices on the switch/bridge, regardless of a transparent or a non-transparent bridging mode being used. Because the initiator of a load (e.g., store operation) typically waits for a transaction to complete, a device that fails to respond to a TLP may cause the initiator to hang indefinitely. The permanent loss of credits from the indefinite hang may further cause cascading failures. The more devices in a PCIe system that are interconnected via PCIe switches, the higher the blast radius of a failure.

In FIG. 1, system 100 places topology flexibility in the endpoints (virtual instances) and enforces access control service (ACS) in PCIe switch 106. To address a PCIe device, mapping into system 100's input/output (I/O) address space or memory-mapped address space must be enabled. The firmware, device drivers, or the operating system of system 100 may program the base address registers (BARs) to inform a PCIe device of its address mapping by writing configuration commands to the PCIe controller of the device. Because all PCIe devices are in an unconfigured state upon system reset, the PCIe devices do not have addresses natively assigned to them. Therefore, the operating system or device drivers of system 100 cannot communicate with the PCIe devices using the natively assigned addresses, and switches cannot send/receive traffic to/from the PCIe devices through the natively assigned addresses. BARs are simply memory ranges that can be located in a physical memory space and do not change PCIe communication patterns. A PCIe switch (e.g., PCIe switch 106) relies on the complete programming of the BARs to know how to switch traffic between the attached PCIe peer devices (e.g., endpoints 104).

Based on PCIe 5.0, CXL is published as an open standard for high-speed CPU-to-device and CPU-to-memory interconnection. CXL is designed to accelerate the performance of next-generation data center servers. CXL is built on the PCIe physical and electrical interfaces with protocols in three key areas: I/O, cache, and memory coherence, i.e., CXL.io, CXL.cache, and CXL.mem. CXL technology maintains memory coherency between the CPU memory space and memory on attached devices, which allows resource sharing for higher performance, reduced software stack complexity, and lower overall system cost.

The CXL.cache protocol defines interactions between a host and a device, allowing attached CXL devices to efficiently cache host memory with very low latency using a request-response approach. The CXL.mem protocol provides the master CXL device (typically a host processor) with access to the memory of an attached subordinate CXL device (e.g. accelerator, dynamic random access memory (DRAM), Flash) using load and store commands. This approach can support both volatile and persistent memory architectures. Both CXL.cache and CXL.mem allow interacting directly with CPU cachelines. According to the CXL specification, physical addresses are required for these transactions, which eliminates host-to-host transfers since that would cause address resolution conflicts between two independent hosts. CXL also adds low latency direct injection into CPU cachelines. CXL, however, does not currently allow peer-to-peer communication between endpoints. That is, all data movements/communications between endpoints have to be facilitated through the root complex, and the communications rely on the maintenance of the global physical address space in the root complex. PCIe/CXL switches currently function only to increase fan-out from a small number of CPU lanes.

Multi-Plane, Multi-Protocol PCIe/CXL System Overview

Figure 2:
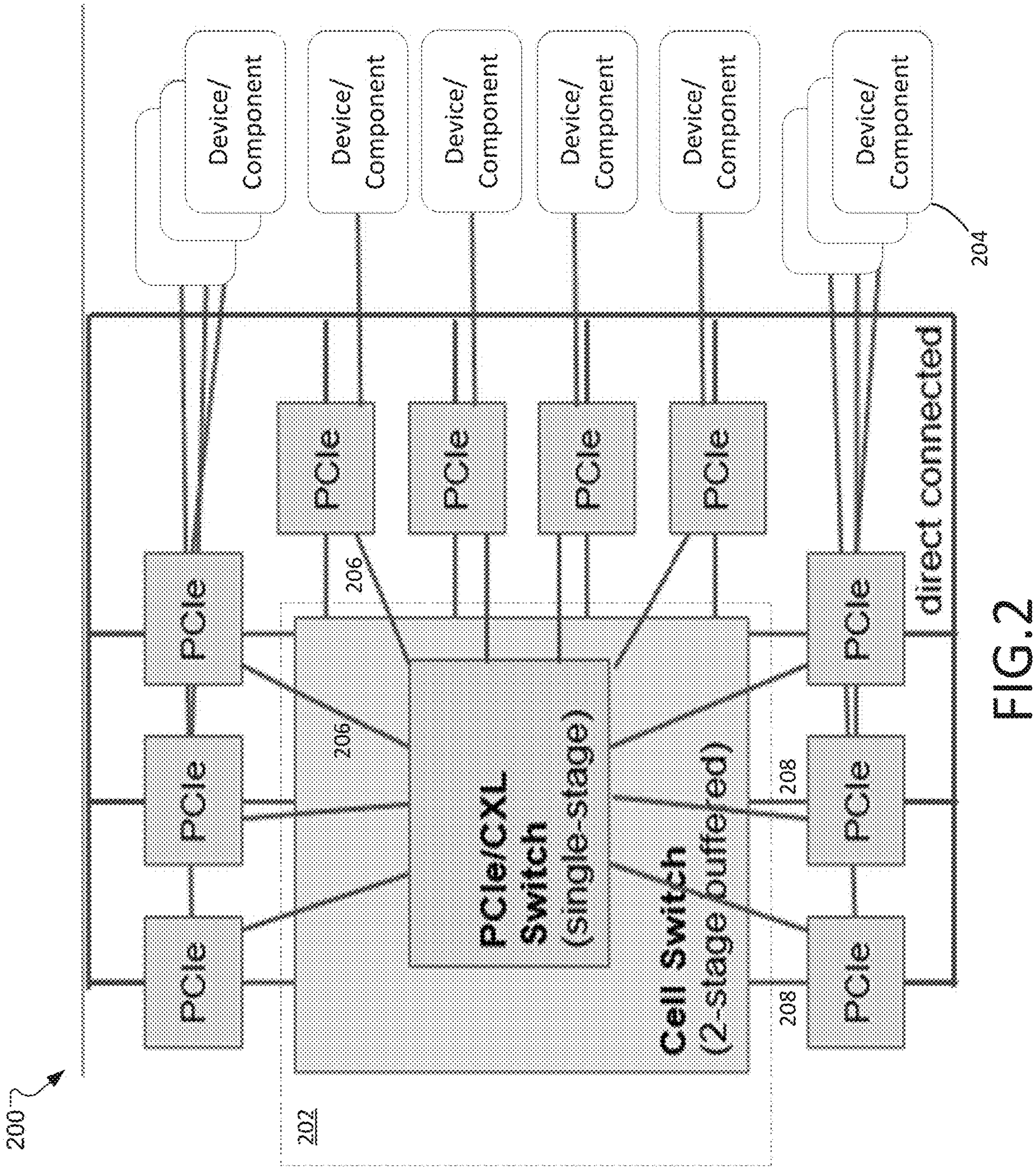
FIG. 2 illustrates an exemplary system that includes a tiered, multi-protocol PCIe/CXL memory switch architecture, according to some embodiments.

FIG. 2 illustrates an exemplary system 200 that includes a tiered, multi-protocol PCIe/CXL memory switch architecture, according to some embodiments. As compared to the conventional PCIe system 100 in FIG. 1, a PCIe/CXL switch 202 of FIG. 2 has superior topological flexibility, reliability, and configurable transport attributes.

PCIe/CXL switch 202 provides for a multi-ported, multi-planar fabric that supports arbitrary topological carve-outs. FIG. 2 includes multiple PCIe trees. For each PCIe tree, the switch ports of PCIe/CXL switch 202 can be connected to either root complex(s) or endpoints that are associated with the root complex(s). Unlike the PCIes system 100 in FIG. 1 which requires the allocation of NTB memory buffers to bridge between addressing domains, the mesh in FIG. 2 can be segmented along arbitrary boundaries to create a fully flattened tree of PCIe/CXL sources and destinations. PCIe/CXL switch 202 in FIG. 2, therefore, provides reliable packet-based transport between attached nodes, including payload transfers from host-to-host, host-to-endpoint, and endpoint-to-endpoint. Even when the endpoints are associated with different host RCs, PCIe/CXL switch 202 in FIG. 2 can ensure reliable packet transport.

PCIe/CXL switch 202 provides for multiple configurable planes of PCIe connectivity between devices:

(i) low latency (e.g., <50 nanoseconds) optimized switching path between physical nearby devices/components 204. For example, devices/components 204 may be devices identified with BDF and attached to a PCIe bus, or other physical components 204 used or attached in other environments (e.g., CXL links).

(ii) a single-stage PCIe/CXL switching tree for arbitrary non-neighbor communication as shown in 206, and (iii) buffered bulk transport over a 2-stage protocol-agnostic cell switch as shown in 208.

The buffered bulk transport provides optimized bulk memory reads/writes for streaming engines, and can bridge multiple communication protocols. The communication protocols include, but are not limited to, PCIe, CXL, Ethernet, transmission control protocol/internet protocol (TCP/IP), and other network protocols at layer-2 (data link layer), layer-3 (network layer), and layer-4 (transport layer) of the OSI model.

In some embodiments, the optimized switching path of (i) may be implemented as an operating mode of the fully arbitrary PCIe/CXL switch in (ii). For example, the optimized switching path of (i) may be implemented by using low-latency direct-neighbor data paths combined with scheduling optimization. The low-latency direct-neighbor data paths may be components of a larger multi-hop data path of (ii). The scheduling optimization may prefer low-latency transfers, but potentially at the expense of centrally-controlled arbitration and scheduling.

Within each PCIe tree, every endpoint (as shown below in FIG. 3) is a peer of each other such that peer-to-peer packet transfers require no intermediate hops through a root complex or an additional switch. Since endpoints of the same PCIe tree communicate with each other without RC and additional switches, fully-switched and work-conserving bandwidth across all endpoints is achieved.

The present PCIe/CXL system 200 in FIG. 2 uses an internal PCIe/CXL endpoint mechanism to provide bridging into protocols with more functionality than standard PCIe/CXL systems. In some embodiments, an internal endpoint of switch 202 is configured to be visible to the rest of system 200 as a full PCIe endpoint, and act as a PCIe peer to all devices through the standard protocol (e.g., BDFs, BARs). The internal endpoint is not a standard external endpoint that is electrically attached to an externally pinned PCIe port (e.g., external to the chip of switch 202). In some embodiments, one or more internal endpoints are configured to expose the memory interfaces for (i) a bulk data transfer engine (fabQ) and (ii) a fast cacheline exchange engine (fabX) to external endpoints. This enables greater intercommunication capabilities than capabilities available in previous PCIe switch trees. For example, the use of internal endpoints in the present PCIe/CXL system 200 allows the disaggregation of PCIe/CXL devices within a tree (e.g., to prevent shared-fate failure modes), QoS-aware classification and traffic engineering akin to networking devices, advanced security policies, etc. The internal PCIe/CXL endpoints may enable data flows with rich semantic context. The internal PCIe/CXL endpoints may also be applied in any fabric, as shown in 204, 206, and 208, to optimize system performance and latency within the functional requirements. The internal PCIs/CXL endpoints, fabQ, and fabX will be described in detail with reference to FIGS. 3 and 4.

Multi-Plane, Multi-Protocol PCIe/CXL System Implementation

Figure 3:
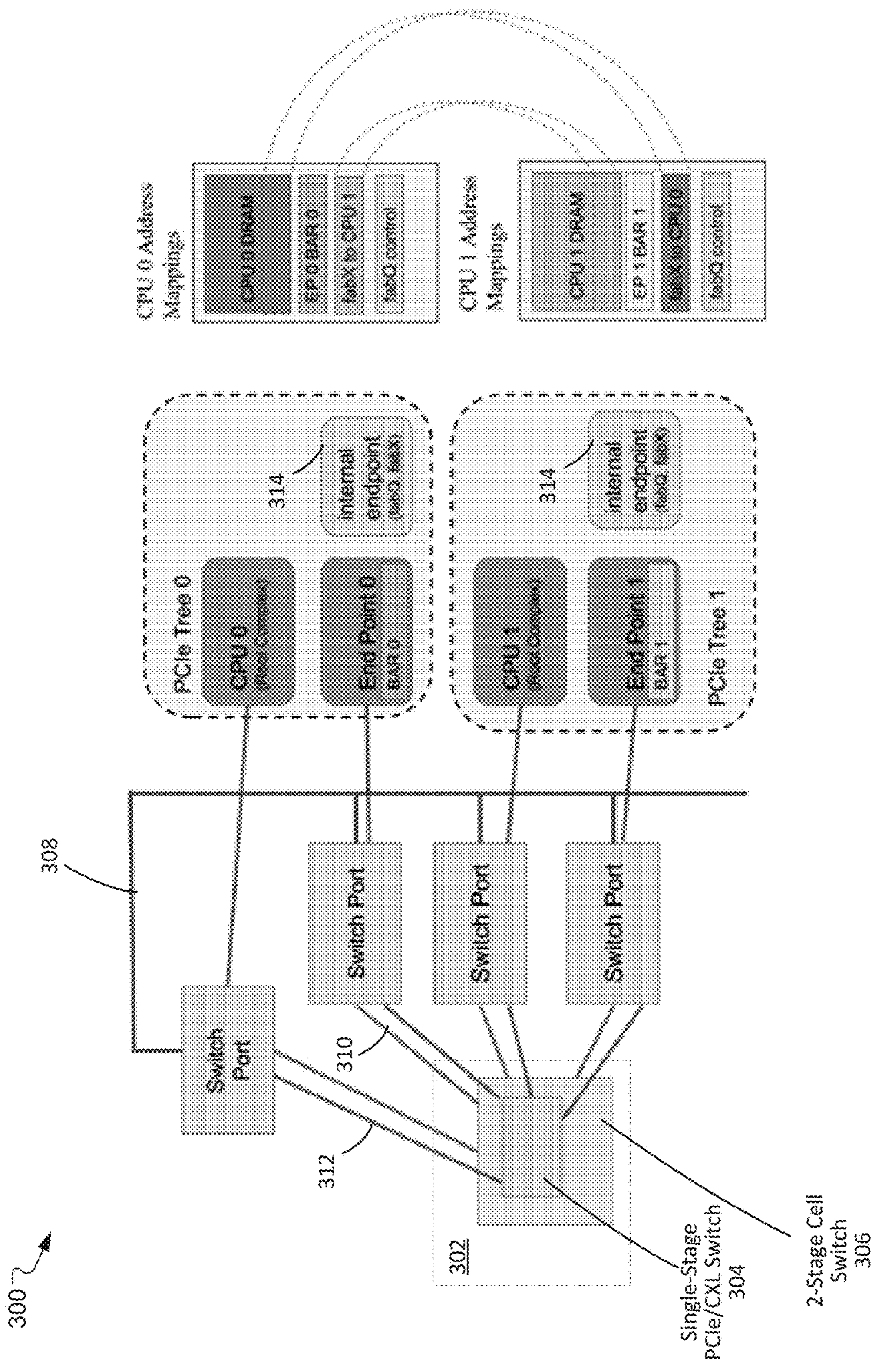
FIG. 3 illustrates an exemplary topography and implementation of a tiered, multi-protocol switch, according to some embodiments.

FIG. 3 illustrates an exemplary topography and implementation 300 of a tiered, multi-protocol switch, according to some embodiments. As shown in FIG. 3, switch 302 provides multiple planes to access endpoint memory regions, through either single-stage PCIe/CXL switch 304 or 2-stage buffered cell switch 306. Each plane has a distinct combination of bandwidth, latency, and functional attributes that can be dynamically selected by the system to suit the type of desired packet transfer.

In some embodiments, switch 302 may allow pure PCIe/CXL reads and writes to be made directly to physical system addresses, on either direct connecting path 308 (e.g., path 204 in FIG. 2) or switching paths 310 (e.g., path 208 in FIG. 2). In this case, the data transfer is governed by PCIe/CXL messaging and ordering rules.

Alternatively, switch 302 may use fabQ control to initiate data movement through switching paths 312 (e.g., path 206 in FIG. 2). The fabQ control structure is exposed in the BAR space of internal endpoints 314. The data movement through switching paths 312 between attached memory regions using the fabQ protocol may employ network-style addressing, communication, security models, etc.

Alternatively, switch 302 may also translate a direct fabX window access into an access on a destination memory region over path 308 or at the level of single-stage PCIe/CLS switching 304. The direct fabX window access is performed within the fabX BAR space of internal endpoints 314 and follows fabX protocol semantics.

The additional indirection provided by fabQ and fabX can be used to provide additional performance, isolation, resiliency, and addressing properties beyond those provided with standard PCIe or CXL switches and interfaces.

In some embodiments, the multi-tiered and multiprotocol PCIe/CXL switch 302 of FIG. 3 may provide unique and secure communication interfaces, including (i) fabX for fast cacheline exchanges using the first-tier (e.g., 308) and the second switching tier (e.g., 312), and (2) fabQ for bulk data transfers in the third tier (e.g., 310).

In some embodiments, switch 302 may also be configured to supplement the interfaces (i) and (ii) with traditional memory address mapping capabilities such as Non-Transparent Bridges (NTB). In this way, switch 302 may enable system memory allocated to the NTB to function as a pass-through address map to non-system memory (e.g., addresses in a different PCIe hierarchy), thereby supporting direct PCIe traffic between devices in different PCIe hierarchies.

Figure 4:
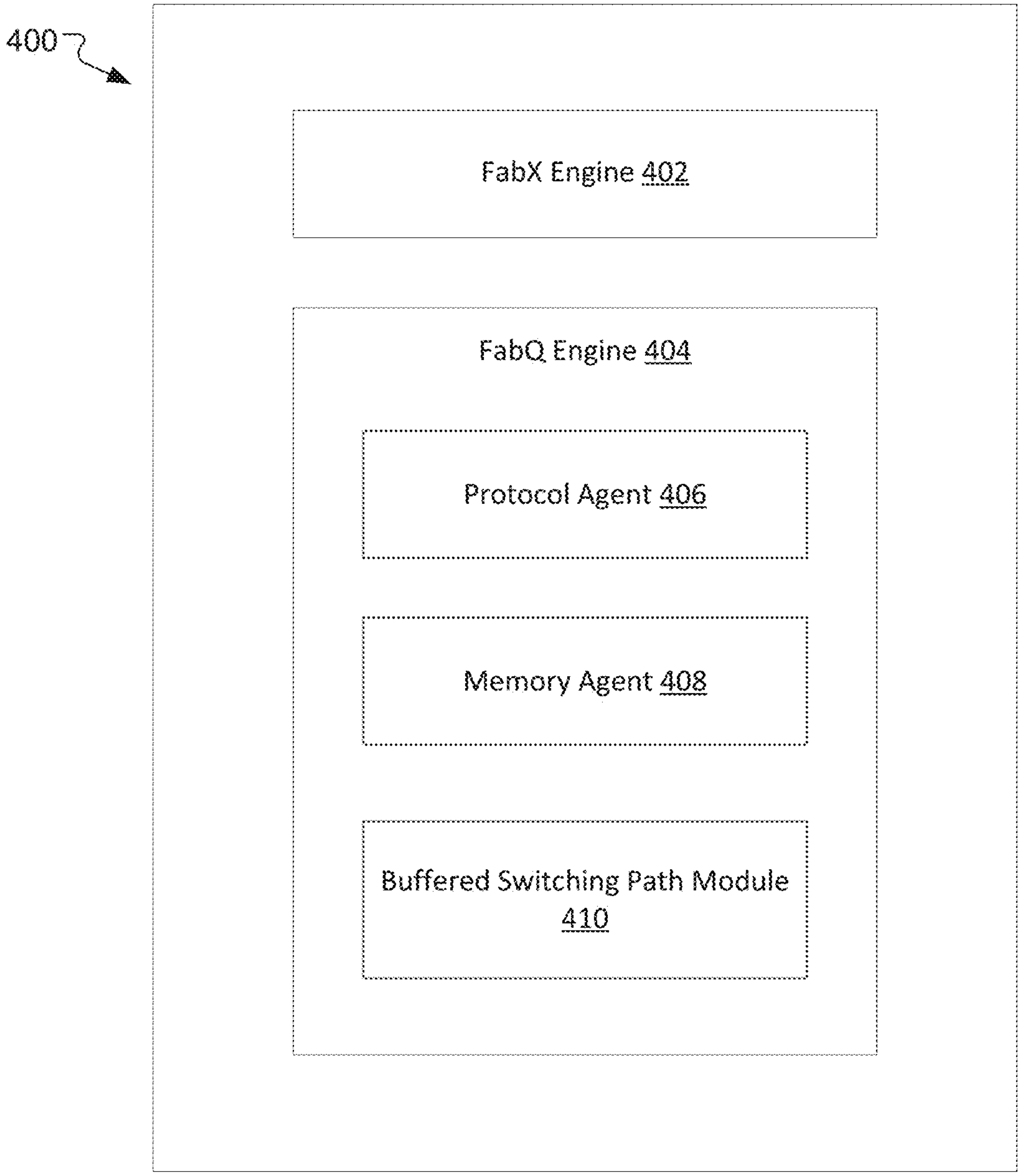
FIG. 4 illustrates components of a switching subsystem, according to some embodiments.

As shown in FIG. 4, in some embodiments, a switching subsystem 400 includes a fabX engine 402 and a fabQ engine 404 to respectively implement the fabX fast cacheline exchange and fabQ bulk data transfer. Switching subsystem 400 may be formed by at least switch 302 coupled with one or more internal endpoints 314. Switching subsystem 400 may also be divided into a fabQ subsystem and a fabX subsystem depending on the functions they respectively perform. In FIG. 4, fabQ engine 404 includes a protocol agent 406, a memory agent 408, and a buffered switching path module 410. In some embodiments, one or more remote switches or switching subsystems with each including a fabX engine and a fabQ engine may also communicate with the local switching subsystem 400 to perform the functionalities described herein.

FabX Implementation

Referring back to FIG. 3, switch 302 may implement fast cacheline exchange using fabX engine 402. In some embodiments, fabX engine 402 may pair the memory windows between two PCIe/CXL endpoints. Based on this pair, fabX engine 402 may enable writes in one address space to alias onto another address space by generating the appropriate destination memory writes. The alias or mapping between the two address spaces is based on a BAR window from an internal endpoint 314. The other address space may be accessed potentially across PCIe trees or even the network connections. In some embodiments, fabX engine 402 may support scoreboarding modes (e.g., dynamic instruction scheduling and execution) to allow efficient backpressure and notification capabilities, which further triggers cacheline monitors or enhanced message signaled interrupts (MSI-X interrupts) on a remote CPU.

In some embodiments, when used with CXL.cache, fabX engine 402 may allow the destination memory writes to be injected directly into the cache of the receiving processor. This is applicable even if the source writes to fabX uses a different protocol other than CXL (e.g., PCIe). In some embodiments, responsive to the writes from the source, fabX engine 402 may either generate CXL memory writes or invalidate the writes at the destination. FabX engine 402 may then pull cachelines on-demand from source memory or from the on-chip cache. Based on CXL.cache, fabX engine 402 may flush any on-chip cache to destination DRAM on cache eviction. No data direct I/O (DDIO) is needed. No useful data is evicted from the cache (e.g., destination DRAM) because of the new data load. In this way, fabX engine 402 provides no cache pollution, and the CPU can sleep within a spin-poll loop until a cache update is detected. As a result, system complexity associated with moving low-latency cachelines between non-coherent CPUs is reduced, and the host CPU efficiency is improved significantly.

In some embodiments, fabX engine 402 may allow data transfers to be ferried remotely over a network. For local fabX movement, fabX engine 402 may translate memory accesses from a source into the appropriate memory accesses at a destination. FabX engine 402 may also perform the translation of memory accesses to a remote memory destination. In some embodiments, fabX engine 402 may tunnel the memory accesses from the source within a network connection, where the network connection is configured to terminate in a pre-defined destination memory space at a remote switch. For example, fabX engine 402 may perform a fabX write operation. A fabX write may originate at the source as a PCIe write from the sending CPU to a fabX BAR region. FabX engine 402 may then tunnel the fabX write over a network connection to the remote switch. The remote switch may be of the same form as shown in FIG. 3. The remote switch may then use a second, remote fabX engine to convert the transaction (e.g., data in the fabX write) to an appropriate CXL write to the remote CPU's memory space, along with one or more appropriate notifications that alert the receiving CPU.

FabQ Implementation

Switch 302 may implement bulk data transfer using fabQ engine 404. FabQ engine 404 may be used to generate a high-bandwidth bidirectional data stream between two software interfaces on arbitrarily local or remote endpoints. In contrast with standard PCIe/CXL switching methods, fabQ engine 404 may apply Layer-2 Ethernet forwarding semantics to data received from PCIe/CXL interfaces, thereby expanding the addressability and increasing the security and resiliency of data flows within the system or network.

Switch 302, through the fabQ mechanism, provides a way to steer cells over PCIe transactions using:

- a submission queue, together with its security associations,
- memory pointers via a scatter-gather list (SGL), together with its security associations, and
- a completion queue.

A submission queue is a buffer including new entries (e.g., pointers to data payloads or data payloads) to be executed or transferred, and a completion queue is a buffer used to post the status for completed entries. Data or data payload identifies the data portion of a data packet that includes both header(s) and data. An SGL is a list of buffer locations with associated control and size information, which is used to show how an operation should perform. The local fabQ subsystem includes a protocol agent 406, a memory agent 408, and a buffered switching path module 410, as shown in FIG. 4.

Protocol agent 406 handles the headers associated with transmit data packets. In some embodiments, protocol agent 406 may generate forwarding headers and transmit headers associated with data packets and provide the generated headers to switch 302. Protocol agent 406 may also receive the headers delivered from switch 302. Protocol agent 406 may further receive notification updates from switch 302 with completion queues and operates accordingly. For example, protocol agent 406 may inform a source device that a data transaction has failed.

Memory agent 408 identifies the payload portion of the transmit data packets by using scatter-gather lists, where the scatter-gather lists point to buffers in memory. In some embodiments, memory agent 408 may send the scatter gather lists to protocol agent 406 via fabX. Protocol agent 406 may then identify the scatter gather lists in the transmit headers of the transmit data packets to be sent to switch 302. In other embodiments, memory agent 408 may send the scatter gather lists directly to switch 302, via a submission queue and completion queue.

The way that the fabQ protocol forwards the data packets between local peer-to-peer endpoints is explained below. In some embodiments, a contiguous address space or range is reserved for switch 302. Each logical flow in the fabQ switched PCIe/CxL subsystem is assigned a unique Layer-2 (L2) forwarding media access control (MAC) address in this reserved contiguous address space. A logical flow may be represented by a specific source-destination pair. In some embodiments, this address range may be sized to the total number of flows (e.g., source-destination pairs) to be supported in the entire switching domain of attached PCIe/CXL nodes. The first address, i.e., base address, is usually made configurable.

In some embodiments, switch 302 may switch a data packet using the fabQ protocol with the following procedure. First, responsive to the data packet from a source device, switch 302 may receive a transmit header associated with the data packet generated by protocol agent 406. The transmit header has an L2 forwarding header, and the forwarding header includes a destination MAC address (dmac). Switch 302 may then compare the packet dmac with the reserved contiguous range of L2 forwarding addresses to determine whether the dmac address is within the range.

If the dmac address is within the range, switch 302 may identify a target identifier based on the dmac address and the range of forwarding addresses, and transmit the data packet to a destination device represented by the target identifier via peer-to-peer fabQ communication. In some embodiments, switch 302 may subtract the base address from the packet dmac to determine the target ID.

However, if the destination MAC address is outside the range of forwarding addresses, the data packet is not eligible for peer-to-peer fabQ transport and is therefore processed by switch 302 as a normal network packet. Switch 302 may forward the data packet to a network port for transmission. In some embodiments, the network port used to forward the data packet is an Ethernet network port.

By reserving a contiguous dmac address range and using a private organizationally unique identifier (OUI), switch 320 can replace a large number of content-addressable memory entries for the fabQ forwarding lookup with a simple comparator circuit. Therefore, the chip area and power are significantly reduced.

In some embodiments, communications via the fabQ protocol are based on a 2-stage buffered switching path, e.g., managed by buffered switching path module 410. The 2-stage buffered switching path allows advanced per-packet policy and capabilities, such as flow tracking and management, efficient data streaming, QoS, etc. The fabQ buffered cell switch path can be used for local PCIe/CXL peer-to-peer communication, as well as to/from network connections. When using the fabQ protocol for external network connections, the cell switch 306 of switch 302 may need to interact with other external switches as part of the data path. Based on the fabQ, the cell switch 306 of switch 302 may enable a unified local/network protocol for moving data out of an interface (e.g., Ethernet or PCIe/CXL) using consistent header forwarding and classification semantics. This produces much greater protocol efficiency than existing methods. These existing methods bridge between PCIe/CXL and network interface domains using encapsulation (e.g., PCIe/CXL over Ethernet) or intermediate protocols (e.g. PCIe 5.0).

The cell switch 306 requires a minimal L2 forwarding header to switch a peer-to-peer packet using the fabQ protocol between PCIe/CXL endpoints. However, an application does not need to invoke the networking stack for every peer-to-peer packet. Instead, application software may request that system software provide an L2 header one single time for a given source-destination pair. The application software may repeatedly use the same L2 header for subsequent data packets of the given source-destination pair, which reduces peer-to-peer communication complexity and latency. For example, a first data packet is associated with a first forwarding header. Upon receiving a second data packet subsequent to the first data packet, cell switch 306 may determine whether to generate a new forwarding header for the second data packet. If the second data packet and the first data packet are from the same source device and to the same destination device, cell switch 306 may associate the first forwarding header with the second data packet without generating a new forwarding header. Otherwise, cell switch 306 may generate a new L2 forwarding header for the second data packet.

From the perspective of application software, an L2 forwarding header is an opaque token passed to the cell switch 306 with each payload data transfer between endpoints. In other embodiments, the application software may be made completely oblivious of this token. For example, the network stack may pre-post headers, and hardware derives the L2 header from the pre-posted headers and the data generated by the application software.

In some embodiments, cell switch 306 also allows peer-to-peer packets to be subject to classification and security filtering, similarly to network packets. This may prevent unauthorized application software from accessing endpoints that are required to be isolated. Cell switch 306 may implement filtering using ternary content addressable memory (TCAM) structures. TCAM allows wildcard entries that match multiple headers. Cell switch 306 may allow a data packet only if it matches an entry in the TCAM. In some embodiments, software allocates peer-to-peer targets in contiguous groups so that a single wildcard entry can match all target flows in a group. By using a packet dmac address as a filtering mechanism, cell switch 306 may apply network policy and filtering semantics directly to peer-to-peer transfers using the same TCAM structures. In contrast, isolation is achieved in a typical PCIe switch by limiting which physical addresses are mapped to each process' virtual address spaces.

In a traditional network switch, network flows are back-pressured, and network packets are selectively dropped using a buffer admission control mechanism, based on various metrics regarding the switch buffer occupancy. However, as described herein, an augmented admission control mechanism may be applied to prevent both peer-to-peer and peer-to-network packets from being scheduled from PCIe/CXL endpoints until buffering in the cell switch 306 is available. For any packets originating from a PCIe/CXL endpoint, cell switch 306 maintains precise information about which flows are congested. When a flow becomes blocked in destination-side processing, cell switch 306 may block the corresponding source queues so that data packets are not scheduled to be fetched from the memory of PCIe/CXL endpoint devices. Accordingly, the likelihood that switch buffers will be sufficiently filled to trigger admission control is reduced, and unnecessary throttling of other flows is avoided.

Unlike existing PCIe/CXL switches, switch 302 is able to apply network reliability attributes to peer-to-peer packets exchanged between PCIe/CXL endpoints. For example, in the case of packet corruption, protocol agent 406 may be alerted that a problem has occurred. Protocol agent 406 may inform the source device that the transaction failed without causing a system crash or hang, and/or protocol agent 406 may disable the corresponding peer-to-peer packet flow until cleanup occurs.

Switch 302 may also provide an additional reliability mechanism. This mechanism may enable the recovery from an unsuccessful delivery of network packets to a destination PCIe/CXL endpoint, using the peer-to-peer communication path. In some embodiments, when an inbound network packet encounters an error, switch 302 may divert the packet to the protocol agent 406 via a fix-up queue. Protocol agent 406 may receive the full packet, determine and resolve the issue, and re-send the packet to the originally intended target queue. When system software in protocol agent 406 re-sends the packet, protocol agent 406 may specify the final target using an L2 header with the dmac address of the target flow. This L2 header is only used for local switching purposes and is not delivered to the target, that is, only the original/modified packet is delivered. This method allows fixed-up packets to be sent to their intended final destinations without having to program the switch to recognize packets that normally originate from another network endpoint.

Figure 5:
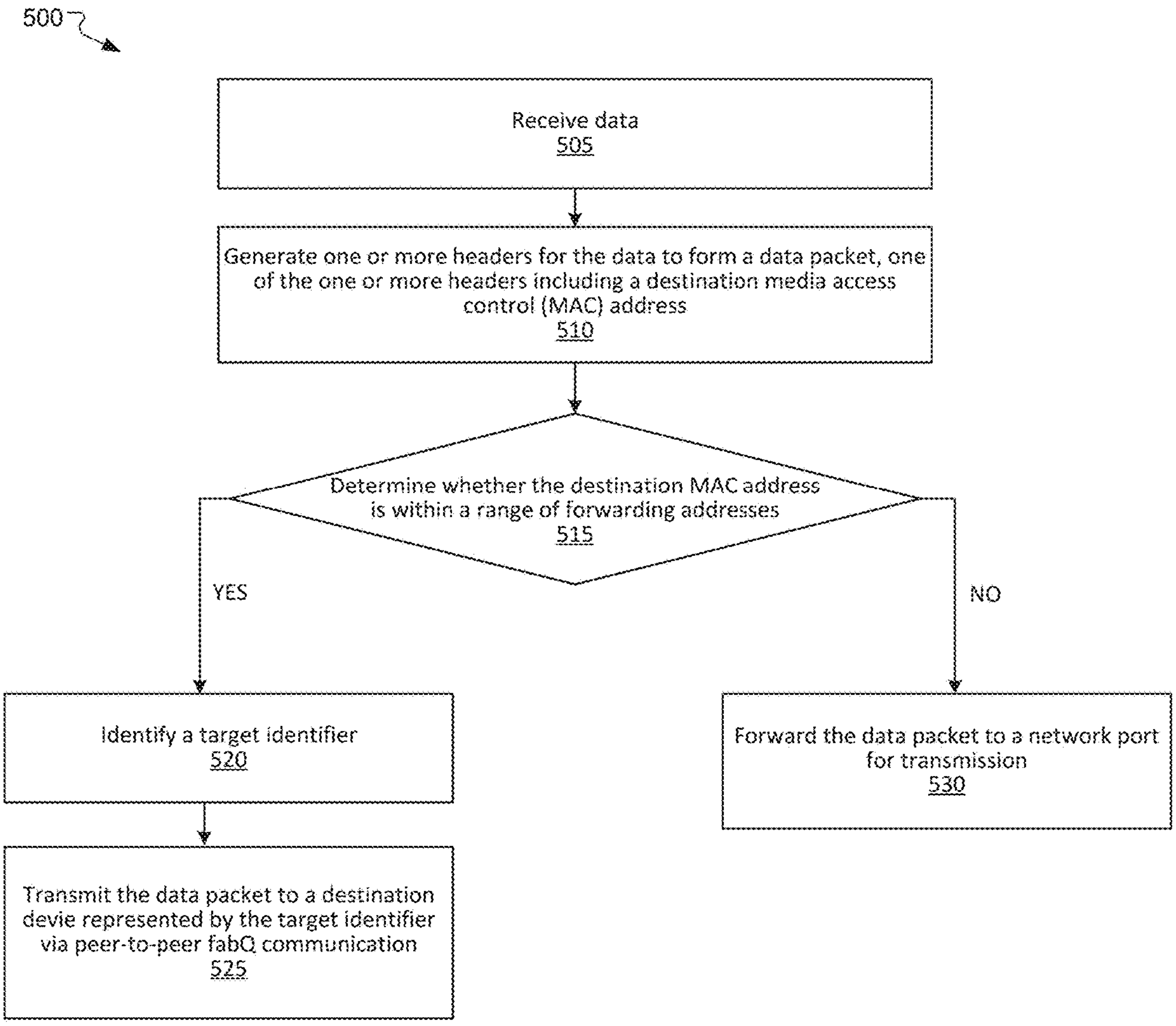
FIG. 5 illustrates an exemplary process of bulk data transfer using fabQ protocol by a multi-plane, multi-protocol switch, according to some embodiments.

FIG. 5 illustrates an exemplary process 500 of bulk data transfer using fabQ protocol, according to some embodiments. In some embodiments, a memory switch system includes at least one multi-plane, multi-protocol switch (e.g., switch 302) communicatively coupled to multiple root complex devices and endpoints. The at least one switch in connection with or more internal endpoints provides the fabQ control, as shown in the exemplary process 500. An internal endpoint is configured to help implementation of fabQ control, and is not a standard external endpoint that is electrically attached to an externally pinned PCIe port.

At step 505, data from a source device is received. For example, the data may describe an access from one external endpoint to another external endpoint. At step 510, one or more headers are generated for the data to form a data packet, e.g., by protocol agent 406. The one of the one or more headers (e.g., a forwarding header) includes a destination MAC address associated with the data packet.

In some embodiments, a contiguous address range of L2 forwarding addresses is reserved for the switch. The contiguous address range has a configurable first/base address. At step 515, it is determined whether the destination MAC address (dmac) is within the reserved range of forwarding addresses based on a comparison of the packet dmac with the reserved contiguous range.

If the dmac address is within the range, a target identifier is identified at step 520 and the data packet is transmitted to a destination device represented by the target identifier via peer-to-peer fabQ communication at step 525. In some embodiments, the target ID is determined based on subtracting the base address from the packet dmac.

However, if the packet dmac is outside the range of forwarding addresses, it means that the data packet is not eligible for peer-to-peer fabQ transport. The data packet will be processed as a normal network packet. At step 530, the data packet is forwarded to a network port (e.g., an Ethernet network port) for transmission.

Figure 6:
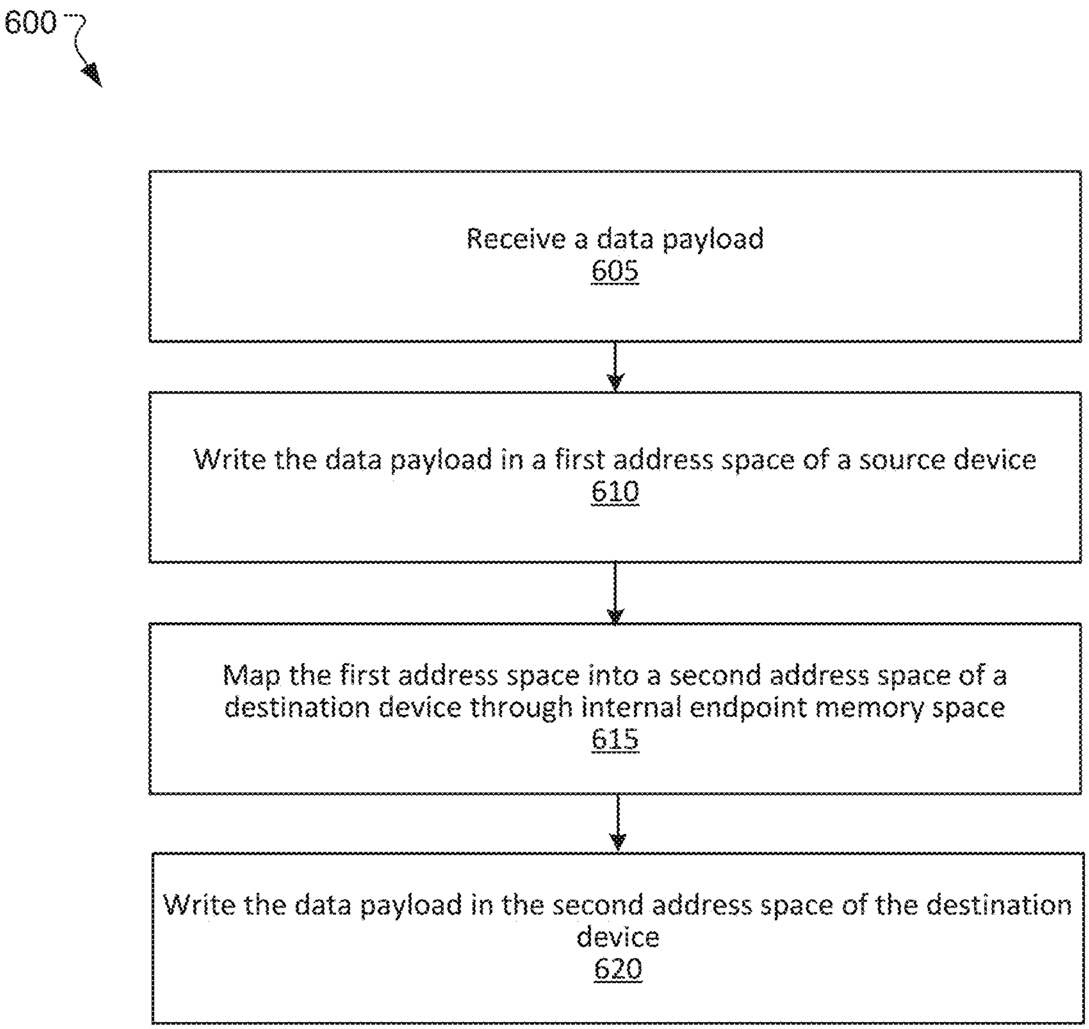
FIG. 6 illustrates an exemplary process for fast cacheline exchange in a memory switching system, according to some embodiments.

FIG. 6 illustrates an exemplary process 600 for fast cacheline exchange in a memory switch system, according to some embodiments. In some embodiments, a memory switch system includes at least one multi-plane, multi-protocol switch (e.g., switch 302) communicatively coupled to multiple root complex devices and endpoints. The at least one switch in connection with one or more internal endpoints provides the fabX data exchange, as shown in the exemplary process 600. An internal endpoint is configured to help fabX implementation, and is not a standard external endpoint that is electrically attached to an externally pinned PCIe port.

At step 605, a data payload from a source device is received. For example, the data payload or data may describe access from one external endpoint to another external endpoint. At step 610, the data payload is written in a first address space of the source device.

At step 615, the first address space is mapped into a second address space of a destination device, through internal endpoint memory space. In some embodiments, the internal endpoint memory space may include a base address register (BAR) memory window of an internal endpoint in PCIe communication or a CXL memory window of an internal endpoint in CXL communication. For local fabX movement, the translation includes directly translating memory accesses from the source device into the appropriate memory accesses at the destination device. In some embodiments, the translation may also include translating memory accesses to a remote memory destination. In some embodiments, a switch may communicate with one or more internal endpoints to tunnel the memory accesses from the source device within a network connection, where the network connection is configured to terminate in a pre-defined destination memory space at a remote switch. At step 620, the data payload is written in the second address space of the destination device.

ADDITIONAL CONSIDERATIONS

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for multi-protocol data movement and placement in a multi-tiered data placement hierarchy, comprising:
- a plurality of endpoint devices communicatively coupled via a plurality of interfaces; and
- a plurality of data moving components configured to perform the data movement between the plurality of endpoint devices within a same tier of the hierarchy, wherein:
- the multi-tiered hierarchy is organized by one or more of data access latency and achievable capacity, and
- the data movement is performed by the data moving components using one or more semantics based on a plurality of interface interconnect protocols between the plurality of interfaces, wherein the data moving components determine at least one semantic of the one or more semantics for each data movement based on the data access latency and whether data is to be moved between the same tier of the hierarchy.

2. The system of claim 1, wherein:
- the endpoint devices are memory and data storage devices,
- each of the memory and data storage devices is arbitrarily configured to be a remote device or a local device in the hierarchy,
- the remote device is a network attached device that is communicated through network addressing, and
- the local device is included within a compute rack utilizing at least one of peripheral component interconnect express (PCIe) and computer express link (CXL) interfaces and protocols, and is communicated either through memory mapped addressing or through network addressing.

3. The system of claim 2, wherein the remote device comprises at least one remote storage device such as a hard disk drive (HDD) or solid state device (SSD), or at least one remote memory such as non-volatile memory (NVME) or dynamic random access memory (DRAM).

4. The system of claim 2, wherein the local device includes at least one local disaggregated memory such as NVME or DRAM, or at least a main memory such as DRAM.

5. The system of claim 2, wherein the remote device is attached to a network via an Ethernet interface.

6. The system of claim 2, wherein the one or more semantics include at least input/output semantics or network semantics, wherein the input/output semantics is based on load and store operations, and network semantics allows packet-based data transfer.

7. The system of claim 6, wherein each data moving component of the plurality of data moving components comprises:
- a bulk data transfer engine configured to use the network semantics to transfer large blocks of data between local devices (FabQ); and
- a cache line exchange engine configured to transfer low-latency messages between local devices via PCIe/CXL interfaces (FabX).

8. The system of claim 7, wherein the bulk data transfer engine is further configured to perform large blocks of data movement among local devices via PCIe/CXL interfaces using network semantics, and wherein the large blocks of data include data sized in kilobytes or megabytes.

9. The system of claim 7, wherein the cacheline exchange engine is further configured to perform low-latency local cacheline operations via CXL.mem and CXL.cache.

10. The system of claim 7, wherein the low latency indicates a processing time that is no greater than 50 nanoseconds.

11. The system of claim 7, wherein, to transfer the low-latency messages between the local devices, the cache line exchange engine is further configured to transfer the low-latency messages between application processors, or between application processors and controlling hosts.

12. The system of claim 7, wherein the data moving component is further configured to extend load and store operations to remote devices over a network through remote memory access.

13. The system of claim 1, wherein each data moving component of the plurality of data moving components further comprises one or more network interface controllers utilizing standard protocol stacks, and wherein:
- the standard protocol stacks comprise at least one of Ethernet, a transport protocol, and a network protocol,
- the transport protocol comprises at least one of a Transmission Control Protocol (TCP) or a User Datagram Protocol (UDP), and
- the network protocol comprises an Internet Protocol (IP).

14. The system of claim 5, wherein the data moving components are further configured to:
- use network ports to prefetch data from one of the at least one remote storage device;
- send the prefetched data directly to a local compute node for processing;
- retrieve a processed result from the local compute node; and
- send the processed result to a next compute node.

15. The system of claim 5, wherein the data moving components are further configured to:
- use network ports to prefetch data from one of the at least one remote storage device; and
- store the data in at least one of a local storage device or a local memory device.

16. The system of claim 15, wherein the data moving components are further configured to use FabQ to move the data from a local storage device to a local memory device.

17. The system of claim 16, wherein the data moving components are further configured to use FabQ to move the data from a local memory device to an application processor's main memory.

18. The system of claim 14, wherein at least one of the local compute node or the next compute node is a device that performs computation, the device comprising at least one of an application process or a control processor.

* * * * *